US010417039B2

(12) United States Patent
McConnell et al.

(10) Patent No.: US 10,417,039 B2
(45) Date of Patent: Sep. 17, 2019

(54) EVENT PROCESSING USING A SCORABLE TREE

(71) Applicant: Microsoft Technology Licensing, LLC, Redmond, WA (US)

(72) Inventors: Christopher C. McConnell, Redmond, WA (US); William L. Portnoy, Woodinville, WA (US); Steven W. Ickman, Snoqualmie, WA (US); Shahin Shayandeh, Seattle, WA (US); John Anthony Taylor, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 221 days.

(21) Appl. No.: 15/620,267

(22) Filed: Jun. 12, 2017

(65) Prior Publication Data
US 2018/0357096 A1     Dec. 13, 2018

(51) Int. Cl.
G06F 9/48       (2006.01)
G06F 9/46       (2006.01)
G06F 17/27      (2006.01)

(52) U.S. Cl.
CPC ............ G06F 9/4843 (2013.01); G06F 9/466 (2013.01); G06F 9/4881 (2013.01); G06F 17/279 (2013.01)

(58) Field of Classification Search
CPC ............................... G06F 9/466; G06F 9/4881
(Continued)

(56) References Cited

U.S. PATENT DOCUMENTS 7,533,080 B2 *   5/2009   Groff .................... G06F 9/466
7,836,051 B1 * 11/2010   Mason ............... G06F 16/9535
                                                    707/734
(Continued)

FOREIGN PATENT DOCUMENTS

WO    2011160205 A1    12/2011

OTHER PUBLICATIONS

"Proactive Bot", https://docs.botframework.com/en-us/azure-bot-service/templates/proactive/, Retrieved on: Jan. 25, 2017, 6 pages.
(Continued)

*Primary Examiner* — Phillip H Nguyen
(74) *Attorney, Agent, or Firm* — Shook, Hardy & Bacon L.L.P.

(57) ABSTRACT

Methods, systems, and computer program products for dispatching an incoming event are described. A scorable tree is obtained and the incoming event is submitted to a root node of the scorable tree for processing. The incoming event is augmented with scoring data generated by the root node to create a scoring event and the scoring event is iteratively passed from each parent node of the scorable tree to each corresponding child node of the scorable tree for further processing until each leaf node of each branch of the scorable tree is reached, wherein each child node augments an incoming scoring event with additional scoring data and each leaf node generates an intermediate scoring event. Each intermediate scoring result is iteratively passed from each child node of the scorable tree to each corresponding parent node, where each child node produces a scoring result, the scoring result comprising an identification of a path to one or more selected child nodes and final scoring information based on data received from one or more corresponding child nodes.

20 Claims, 15 Drawing Sheets

(58) Field of Classification Search
USPC .......................................... 718/107, 101, 102
See application file for complete search history.

(56) References Cited

U.S. PATENT DOCUMENTS

| | | | |
|---|---|---|---|
| 7,861,252 B2 | 12/2010 | Uszok et al. | |
| 8,479,204 B1* | 7/2013 | Labonte .............. | G06F 11/3419 718/100 |
| 8,660,973 B1 | 2/2014 | Feigenbaum | |
| 8,694,455 B2 | 4/2014 | Eder | |
| 8,930,290 B2 | 1/2015 | Cragun et al. | |
| 8,943,154 B1* | 1/2015 | Bodell ................ | H04L 41/0604 709/206 |
| 9,166,997 B1* | 10/2015 | Guo .................... | H04L 63/1433 |
| 9,715,496 B1 | 7/2017 | Sapoznik et al. | |
| 2002/0120734 A1* | 8/2002 | Riosa ................... | H04L 41/065 709/224 |
| 2003/0167454 A1 | 9/2003 | Iordanov et al. | |
| 2003/0191608 A1 | 10/2003 | Anderson et al. | |
| 2004/0030741 A1 | 2/2004 | Wolton et al. | |
| 2004/0133672 A1* | 7/2004 | Bhattacharya ...... | H04L 63/1416 709/224 |
| 2007/0130219 A1* | 6/2007 | Lin ........................ | H04L 41/00 |
| 2012/0117083 A1* | 5/2012 | Riepshoff ......... | G06F 16/24556 707/748 |
| 2014/0282578 A1* | 9/2014 | Teller .................... | G06F 9/5088 718/104 |
| 2015/0039292 A1 | 2/2015 | Suleman et al. | |
| 2015/0063556 A1 | 3/2015 | Uba et al. | |
| 2015/0066479 A1 | 3/2015 | Pasupalak et al. | |
| 2015/0266672 A1 | 9/2015 | Lert et al. | |
| 2017/0063894 A1* | 3/2017 | Muddu ................ | G06F 16/254 |
| 2018/0293981 A1 | 10/2018 | Ni et al. | |
| 2018/0358006 A1 | 12/2018 | McConnell et al. | |

OTHER PUBLICATIONS

W Andrew R. .Peret.
"Non Final Office Action Issued in US Appl. No. 15/620,365", dated Apr. 4, 2019, 12 Pages.

* cited by examiner

WHAT CAN I HELP YOU WITH?

WHAT ARE YOUR STORE HOURS TODAY?

WE ARE OPEN UNTIL 11 PM TODAY. WHAT WOULD YOU LIKE TO DO?

PLACE AN ORDER.

WHAT WOULD YOU LIKE TO ORDER?

A PIZZA.

WHAT TYPE OF PIZZA WOULD YOU LIKE?

WHITE SAUCE
HAM, PINEAPPLE
RED SAUCE

WOULD YOU LIKE TO CHANGE THE WHITE SAUCE TO RED SAUCE OR ORDER ANOTHER PIZZA?

ORDER ANOTHER PIZZA.

WHAT TYPE OF PIZZA WOULD YOU LIKE?

CANCEL THAT

WOULD YOU LIKE TO CANCEL BOTH OR JUST ONE PIZZA?

CANCEL RED SAUCE PIZZA

CONFIRMED. ANYTHING ELSE?

NO

YOU WOULD LIKE TO ORDER A WHITE SAUCE PIZZA WITH HAM AND PINEAPPLE?

YES

YOUR PIZZA WILL BE READY FOR PICK-UP IN 30 MINUTES.

FIG. 1

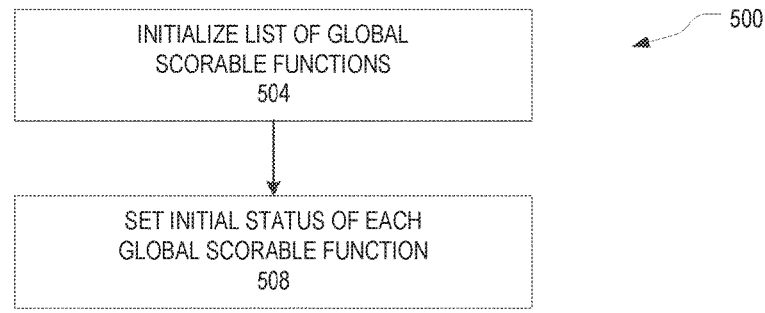
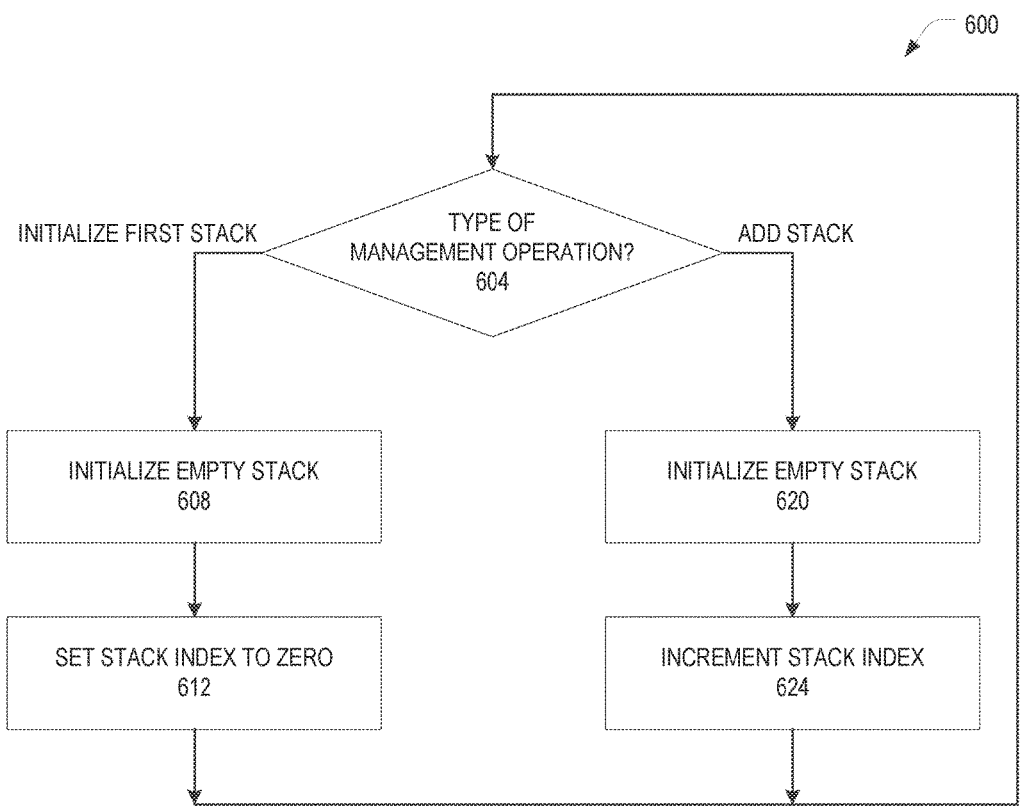

EVENT PROCESSING USING A SCORABLE TREE

CROSS-RELATED APPLICATION

This patent application relates to U.S. patent application Ser. No. 15/620,365, filed Jun. 12, 2017, titled "Dynamic Event Processing," which is hereby incorporated in its entirety.

TECHNICAL FIELD

The present disclosure relates generally to dispatching incoming events for processing. In an example embodiment, but not by way of limitation, the disclosure relates to a mechanism for dispatching incoming events for processing based on a scorable tree incorporating scorable functions.

BACKGROUND

Events and streams of events are often used in data processing to enable the producer of an event to be decoupled from the consumer of the event. Events may be used in many areas of data processing. Chatbots, for example, may be mechanisms for generating conversations in natural language. An event may describe a component of a natural language conversation submitted by a user to a chatbot and may be used by the chatbot for generating a natural language dialog. The conversations may be related to obtaining information, performing tasks, and the like. Chatbots typically follow rigid conversational tracks and may perform poorly in responding to a change of conversational direction or a change of context by a user of the chatbot.

BRIEF DESCRIPTION OF DRAWINGS

The present disclosure is illustrated by way of example and not limitation in the figures of the accompanying drawings, in which like references indicate similar elements and in which:

FIG. 1 is an example of a conversation between a chatbot and a user, in accordance with various embodiments;

FIG. 5 is a flowchart for an example method for managing global scorable functions, in accordance with various embodiments:

FIG. 6 is a flowchart for an example method for managing a scoring stack, in accordance with various embodiments:

DETAILED DESCRIPTION

Figure 2A:
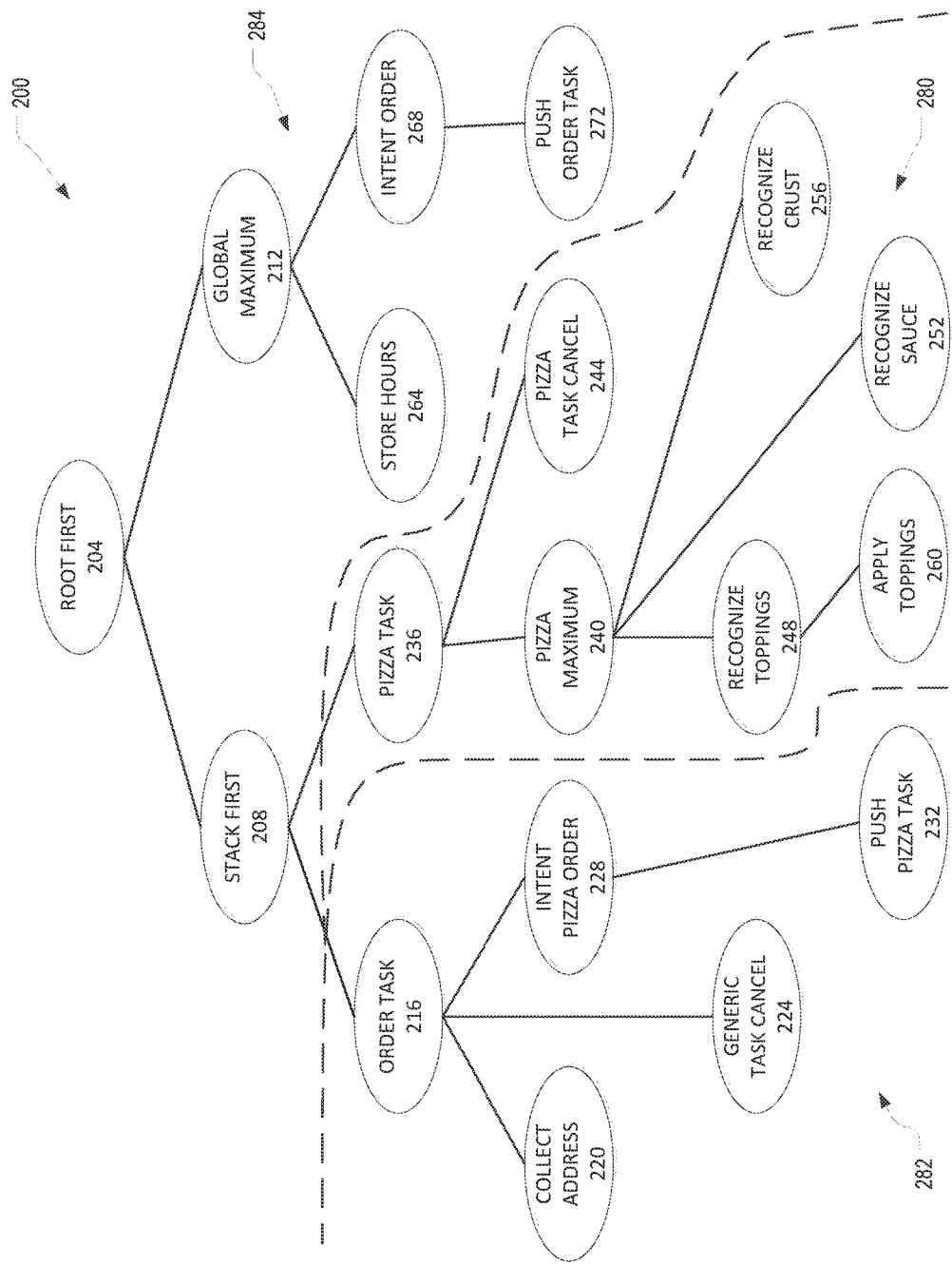
FIG. 2A is a graphical representation of an example scorable tree, in accordance with various embodiments.

The description that follows includes illustrative systems, methods, techniques, instruction sequences, and computing program products that embody example embodiments of the present disclosure. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for dispatching incoming events in a processing system are described. In one example embodiment, a scorable function determines a score for use in dispatching an incoming event. The incoming events can be, for example, a component of a natural language conversation submitted by a user (such as textual information, a natural language utterance, and the like), a user's interaction with visual elements (such as a selection of a post back button within a quick reply), or an external event (such as a timer expiration, triggers in a software as a service offering, connector payments, and the like). For example, in the context of a chatbot, the score may indicate whether a user utterance matches a question posed by the chatbot, matches a particular user intent or context, and the like. The score from one or more scorable functions may then be used to dispatch the incoming event to the appropriate component for processing.

Events may be modeled as a stream of events. The model of a stream of events may be used to capture the full interaction of a chatbot with a user, and the stream of events may be further annotated with metadata describing the semantics of the conversations (such as which chatbot controller is active, which chatbot controller generated a response to the user, and the like) or debugging information (such as responses generated by cognitive services and the like).

FIG. 1 is an example of a conversation between a chatbot and a user, in accordance with various embodiments. The dialog of the chatbot (left-side of FIG. 1) and the dialog of the user (right-side of FIG. 1) are displayed in sequential order. Initially, the chatbot poses an opening question: "what can I help you with?" The user responds with a request for store hours. A request for general information, such as store hours, may be recognized with a global scorable function associated with a global task, such as the store hours task. The conversation continues as the chatbot attempts to ascertain the intent of the user (in this case, to order a pizza). The user's response of "white sauce" followed by "red sauce" is unclear as to the intent of the user: does the user desire to change the sauce from white to red or to order another pizza. Similarly, the user's response of "cancel that" is unclear as to the intent of the user: does the user desire to cancel the second pizza or both pizzas. The ambiguity is handled by an evaluating the event using a number of scorable functions. Upon clarification of both responses, the conversation proceeds to a confirmation of an order for a single pizza.

In one example embodiment, a developer platform for developing a chatbot capable of dynamically following different conversational tracks is described. The developed chatbot may be capable of responding to a variety of incoming events, such as utterances spoken by a user and internal or external events, such as a time of day indicator, an expiration of a timer, and the like. In some instances, the user dialog entries may be ambiguous, have unclear references or context, and the like. For example, in the process of ordering two books, a user may utter the word "cancel." It may be unclear if the cancel command refers to the last book identified or to both books. The ambiguity may be clarified, for example, by asking the user a follow-up question, by using cognitive services to process the event, and the like. Following recognition of the incoming event, the incoming event is dispatched to a component that will process the event. For example, an incoming event from a user may be the utterance: "hello, I'd like to book a flight" or "I'd like to book a flight from Seattle to Detroit." In either instance, the intent of the utterance (to book a flight) is determined and routed to a component that can process the booking of a flight.

The chatbot may also parse information from the utterance to be used in processing. For example, in the latter utterance, the words "Seattle" and "Detroit" (known as entities of the incoming event or utterance herein) may be parsed from the incoming event and forwarded to the component that will evaluate or process the event. The chatbot may also ask follow-up questions, such as the desired day(s) of travel, to determine or verify the intent of the incoming event, or to ascertain information that would be useful in processing the event. Each response obtained from the user may be processed as a separate event.

As the conversation progresses, the user's position in the conversation is tracked and verified to ensure that the conversation corresponds to the current conversational track. For example, a conversation to book an airline flight may have to be tracked to ensure that it has not diverged to, for example, booking a hotel room. The user utterance may need to be processed to verify that the context of the conversation has not changed, to verify that an answer provided by a user corresponds to an earlier question, and the like. If the utterance does not correspond to the current conversational track, then the conversation may be directed back onto the current conversational track through the use of, for example, a question or directive to the user or the track may be dynamically changed to accommodate the user and a new track (also known as dialog herein) may be established. In the latter case, the original dialog may resume once the new dialog is complete.

In one example embodiment, a scorable function determines a score for use in dispatching an incoming event. For example, in the context of a chatbot, the score may indicate whether a user utterance matches a question posed by the chatbot, matches a particular user intent or context, and the like. The score from one or more scorable functions may then be used to dispatch the incoming event to the appropriate component for processing. By scoring an incoming event, the scorable functions may be used to, essentially, rank the relevance of the incoming event to different conversational tracks. Since the most relevant track may be determined, the scorable functions may be used to enable a conversation to diverge from one conversational track to another. In one example embodiment, the definition of the scorable functions and the points in the conversational track at which divergence is allowed are determined by the chatbot developer. For example, a developer may configure a scoring tree with branches that correspond to different conversational tracks, as described more fully below.

Scorable functions are composable and can be used as building blocks to form complex routing models for dispatching the incoming event. Scorable functions may also, for example, be grouped together as groups or categories. Each group or category may be assigned a priority that can be used to determine an order for evaluating the scorable functions when processing an incoming event. The priority may be implemented via the structure of the scoring tree. For example, a node that utilizes a first policy, as described more fully below, may be used to process different groups of scorable functions based on a priority assigned to each group.

The score generated by a scorable function may be a confidence level that ranges from zero to one, where zero indicates that the incoming event is not relevant to the criteria of the scorable function and a one represents that the incoming event matches the criteria of the scorable function. The score may contain two results: a Boolean that indicates if a match was found and a score value, such as the confidence level described above. In one example embodiment, the scorable function generating the highest score is selected for determining where to dispatch the incoming event (such as for identifying which component to dispatch an incoming event to for processing). In the event of a tie, a tie-breaking algorithm may be used to select a scorable function. For example, in instances where the scores are the same or are within a predefined range of each other, the tie-breaking algorithm may be utilized. The tie-breaking algorithm may, for example, give precedence to scorable functions that reside deeper on the stack, as described more fully below. In one example embodiment, the user may be asked to disambiguate the meaning of their entry as part of the tie-breaking algorithm. The scores of scorable functions may also be normalized in order to accurately compare the scores generated by different scorable functions. Natural language recognition services, such as the language understanding intelligent service (LUIS), provide a normalized zero to one score generated by, for example, a machine learned classifier that may be used for this purpose.

The dispatching of the incoming event may also be based on entities associated with the incoming event, such as the utterance. For example, as described above, "Seattle" and "Detroit" are entities of the utterance "I'd like to book a flight from Seattle to Detroit." In one example embodiment, the scorable functions are configured as nodes of a scorable tree, as described more fully below, and the scorable functions may be passed to the entities associated with the incoming event.

FIG. 2A is a graphical representation of an example scorable tree 200, in accordance with various embodiments. In general, an incoming event is processed beginning with a root node and progressing toward each leaf node. Cognitive services, such as LUIS and regular expressions, will process the incoming event and determine, for example, an intent associated with the event. This may be considered a recognition phase. The processes performed by the nodes of the scorable tree 200 may be executed serially by a single processor or may be distributed and executed in parallel, for example, by an array of processors.

As the incoming event propagates down the scorable tree 200, each node may augment the data with entities that may be inferred from the event (such as the departure and arrival cities for an airline reservation), obtained from an outside data source or a user profile (such as a residential address of the user), and the like. The produced entities may then be consumed by other nodes of the scorable tree 200. For example, the produced entities may be used by a child node of the parent node which produced the entities to complete a template. The template may then be provided by the child node as output information for an ongoing chat.

Scores generated by the leaf nodes during the recognition phase are then compiled together as the scores propagate up the tree from each leaf node toward the root node. As a "winning" score(s) is/are selected at each parent node, the path(s) to the node(s) associated with the "winning" score(s) is/are determined and may be forwarded to the parent node. (In one example embodiment, the child nodes of a particular parent node may be sorted based on the winning score, thereby preserving the identity of the winning node(s) for future use, such as execution of an action during an action execution phase.) Nodes may select winning scores based on a number of policies. The policies may be predefined by, for example, a software developer or may be defined within the node at runtime based on conditions identified by the software developer. A "first" policy selects a score, as the name implies, from the first child (evaluated in a left to right order) that indicates a match of the incoming event. A "maximum" policy selects a score based on a maximum value, and a "random" policy randomly selects one or more scores. In some instances, an "all" policy will select scores from all child nodes and an M of N selection policy will select the scores from M child nodes of N child nodes, where M and N are integers. The values of M and N are selected during the creation of the scorable tree based on the conversational design of the chatbot. In addition, an "always" policy may be used to always indicate a match or always indicate no match. In the case of a parent node that has implemented the "always" policy, the score(s) of any child nodes will always be passed to the parent node of the node implementing the "always" policy. This may be described as a routing phase as the node(s) that will perform the action(s) is/are determined as the scores propagate up the tree and are evaluated by each parent node.

The node(s) that are to perform the action(s) is/are notified by propagating a notification down the tree from the root node to the "winning" nodes; the action(s) is/are then performed. Actions may involve updates to the system state (such as updating a scoring stack) or utilizing a template to generate output. This is the action execution phase.

In the scorable tree 200, a root node (a root first node 204) evaluates an incoming event and passes the event information to its child nodes. Upon reception of the scores from the child nodes, the root first node 204 selects the score, as the name implies, from the first child that indicates a match of the incoming event (evaluated in a left to right order). As described above, scores may be selected based on other policies, such as a maximum value or randomly.

The stack first node 208 evaluates the incoming event based on the elements residing on the scorable stack when the event arrives. As illustrated in FIG. 2A, the possible tasks include an order task (corresponding to the order task node 216) and a pizza task (corresponding to the pizza task node 236). As the name implies, the stack first node 208 selects the score from the first child (evaluated in a left to right order) that indicates a match of the incoming event. As such, the stack first node 208 is known as a combining node; as described above, types of combining nodes include a maximum type that selects a child node having the highest score from all immediate child nodes, a first type that selects the score from the first immediate child node (evaluated in a left to right order) that indicates a match of the incoming event, a random type that randomly selects one or more of the immediate child nodes, an M of N type that selects M of the N immediate child nodes, and an all type that selects all of the immediate child nodes.

The order task node 216 evaluates whether the incoming event corresponds to an ordering task and, in particular, a task associated with ordering a pizza. The order task node 216 forwards the incoming event and associated information to its child nodes: a collect address node 220, a generic task cancel node 224, and an intent pizza order node 228. The collect address node 220 corresponds to a collect address task, the generic task cancel node 224 corresponds to a generic task cancel task, and the intent pizza order node 228 corresponds to a pizza order task. The collect address node 220, the generic task cancel node 224, and the intent pizza order node 228 score the incoming event and pass the scoring information to the order task node 216. The order task node 216 evaluates the scoring information from its child nodes and selects the child node with, for example, the highest score. The order task node 216 passes scoring information and path information to the stack first node 208, which passes scoring information and path information to the root first node 204.

It is noted that the intent pizza order node 228 scores the incoming event via its child node: a push pizza task node 232. If the push pizza task node 232 is selected to perform an action, it will push a pizza task onto the active scoring stack, thereby causing the pizza task subtree 280 to be generated as part of the next scorable tree 200. If the collect address node 220 is selected to perform an action, a request for the buyer's address will be submitted. If the generic task cancel node 224 is selected to perform an action, the scorable stack % will be purged of tasks. This is an example of a state update.

The pizza task node 236 forwards the incoming event and associated information to its child nodes: a pizza maximum node 240 and a pizza task cancel node 244. The pizza maximum node 240 and the generic pizza task cancel node 244 score the incoming event and pass the scoring information to the pizza task node 236. The pizza task node 236 evaluates the scoring information from its child nodes and selects the child node with, for example, the highest score. The pizza task node 236 passes scoring information and path information to the stack first node 208, which passes scoring information and path information to the root first node 204.

To generate a score, the pizza maximum node 240 forwards the incoming event and associated information to its child nodes: a recognize toppings node 248, a recognize sauce node 252, and a recognize crust node 256. The recognize toppings node 248, the recognize sauce node 252, and the recognize crust node 256 score the incoming event and pass their scoring information to the pizza maximum node 240. The pizza maximum node 240 evaluates the scoring information from its child nodes and selects the child node with the highest score. The pizza maximum node 240 passes scoring information and path information to the pizza task node 236, which passes scoring information and path information to stack first node 208, and which passes scoring information and path information to the root first node 204.

It is noted that the recognize toppings node 248 scores the incoming event via its child node: an apply toppings node 260. If the recognize toppings node 248 performs the recognition of the requested toppings, then the scores provided by the apply toppings node 260 may simply indicate a match with a value of one. If the apply toppings node 260 is selected to perform an action, it will add the identified toppings to the pizza order.

The global maximum node 212 is a global scorable function that evaluates the incoming event based on other global scorable functions, such as a store hours node 264 that corresponds to a store hours task and an intent order node 268 that corresponds to an intent order task. The child nodes of the global maximum node 212 represent tasks corresponding to global scorable functions that are available throughout the session. As the name implies, the global maximum node 212 selects the score from the child node that has the highest score of child nodes that indicate a match of the incoming event, and passes scoring information to the root first node 204.

It is noted that the intent order node 268 scores the incoming event via its child node: a push order task node 272. If the push order task node 272 is selected to perform an action, it will push the order task subtree 282 onto the scorable stack, thereby causing the order task subtree 282 to be generated as part of the next scorable tree 200.

It is also noted that the use of multiple nodes can be used to disambiguate unclear submissions by a user. For example, during a dialog to order two different pizzas, a user may utter the word "cancel." It may be unclear if the cancel command refers to one pizza (such as the last pizza ordered) or to both pizzas (i.e., a cancel of the whole order). In FIG. 2A, the use of a generic task cancel node 224 in the order task subtree 282 (which applies to the whole order) and the pizza task cancel node 244 in the pizza task subtree 280 (which applies to a single pizza order) may be used to score the relevance of the user utterance to each possibility and enable the selection of a single response to the user's utterance.

In one example embodiment, a scope is defined for processing the incoming event; the scope identifies the scorable functions that are active at any point in time (i.e., the scorable functions that are evaluated in response to receiving the incoming event). The scope may be defined based on the results of processing the last incoming event. As the conversation progresses, the scope of the conversation and the active scorable functions may change. The scope may be implemented by a stack that contains a reference to the scorable functions that are currently in scope. A stack may be implemented as a data structure in the form of a queue where elements are added, for example, to the end of the queue and any element on the queue may be removed from the queue. The stack may also contain tasks and sub-tasks that are related to the conversation and that correspond to the scorable functions that are related to the tasks and sub-tasks. Scorable functions may also be designated as global scorable functions which exist, for example, through an entire dialog or chatbot session. In one example embodiment, other timelines may be used. For example, a global scorable function corresponding to a time-limited coupon for purchasing a pizza may have a corresponding lifetime. Each global scorable function may be assigned a status, such as active or inactive, which may be used to indicate if the corresponding global scorable function is active and therefore within scope, as described more fully below.

The scoring stack may be a stack containing, for example, the identity of one or more tasks. For example, at any point during execution of a chatbot, a scoring stack may store an identity of one or more human-recognizable tasks; each task may be composed of multiple code-module bot controls. The scoring stack may be used to provide an explicit representation of a multi-turn dialog (such as wait for the next activity event, bookmarks, and the like), a sense of place in conversation (such as a representing a state of a control flow of the conversation), a model for task interruption and resumption (such as for resuming a previous task after interruption by a subsequent task), a bot control composition model (such as an Azure search control that can reuse a date control), a hierarchical event propagation model for scorable actions (such as performing a cancellation of the entire bot control), and the like. Scorable actions include, for example, canceling the current task, resetting the current task, displaying a status of the current task, interrupting the current task, resuming a task (such as continuing the processing of an order form after receiving a question about the weather), and the like.

Actions performed in response to a selection of a winning score provided by a scorable function (known as scorable actions herein) can be combined through an algebra of operations. The algebra of operations may be similar to those of the Language Integrated Query (LINQ) framework component offered by the Microsoft Corporation of Redmond, Wash., USA. For example, additional recognition conditions may be added to the item or filter predicates on the produced score.

In one example embodiment, the item to be recognized or the produced score may be projected; a set of scorable actions can be combined with a score comparison method; and the like. The item recognized by the scorable action becomes an implementation of a resolver interface. The resolver interface allows dependencies to be resolved by type and an optional name. The resolvers can be chained using two methods.

First, the resolvers can be chained in isolation from the scorable action recognition and scoring process.

| | |
|---|---|
| Container | Resolve dependencies from a sophisticated DI container (such as Autofac) |
| Array | Resolve dependencies from a set of instances (such as runtime type auto-wire) |
| Activity | Resolve dependencies by recovering static CLR type from Activity.Type |
| Trigger | Resolve dependencies by recovering runtime type from trigger pay load. |

Second, the resolvers can be chained through the scorable action recognition and scoring process.

| | |
|---|---|
| Method | Recognize parameters by type and name, with the action of method invoke |
| LUIS Intent | Recognize the utterance, chain a LUIS entity resolver, and delegate to method |
| Regular Expression | Recognize the utterance, chain a Regex capture resolver, and delegate to method |

The LUIS intent and regular expression scorable actions delegate their actions to the method scorable action, but augment the resolver item to be recognized by chaining it with a new set of activity-dependent registrations.

As noted above, a scorable function may be assigned as a global scorable function and will remain in existence throughout a corresponding conversation or event processing session. A list of global scorable functions may be maintained where each global scorable function can be set in an active state (where the global scorable function will be evaluated upon reception of an incoming event) or an inactive state (where the global scorable function is not evaluated upon reception of an incoming event). Actions resulting from global scorable functions may trigger the pushing of new tasks onto the active scoring stack (such as interrupting a dialog, followed by resuming the dialog), trigger the creation of a new parallel scoring stack, trigger a resumption of an existing parallel scoring stack, reset the entire active scoring stack, delete a conversation, a user, or per-user-in-conversation data, and the like. Thus, while global scorable functions may be lower in precedence than scorable functions that reside on the stack, an evaluation of a global scorable function can result in a resetting (purging) of the scoring stack.

Figure 2B:
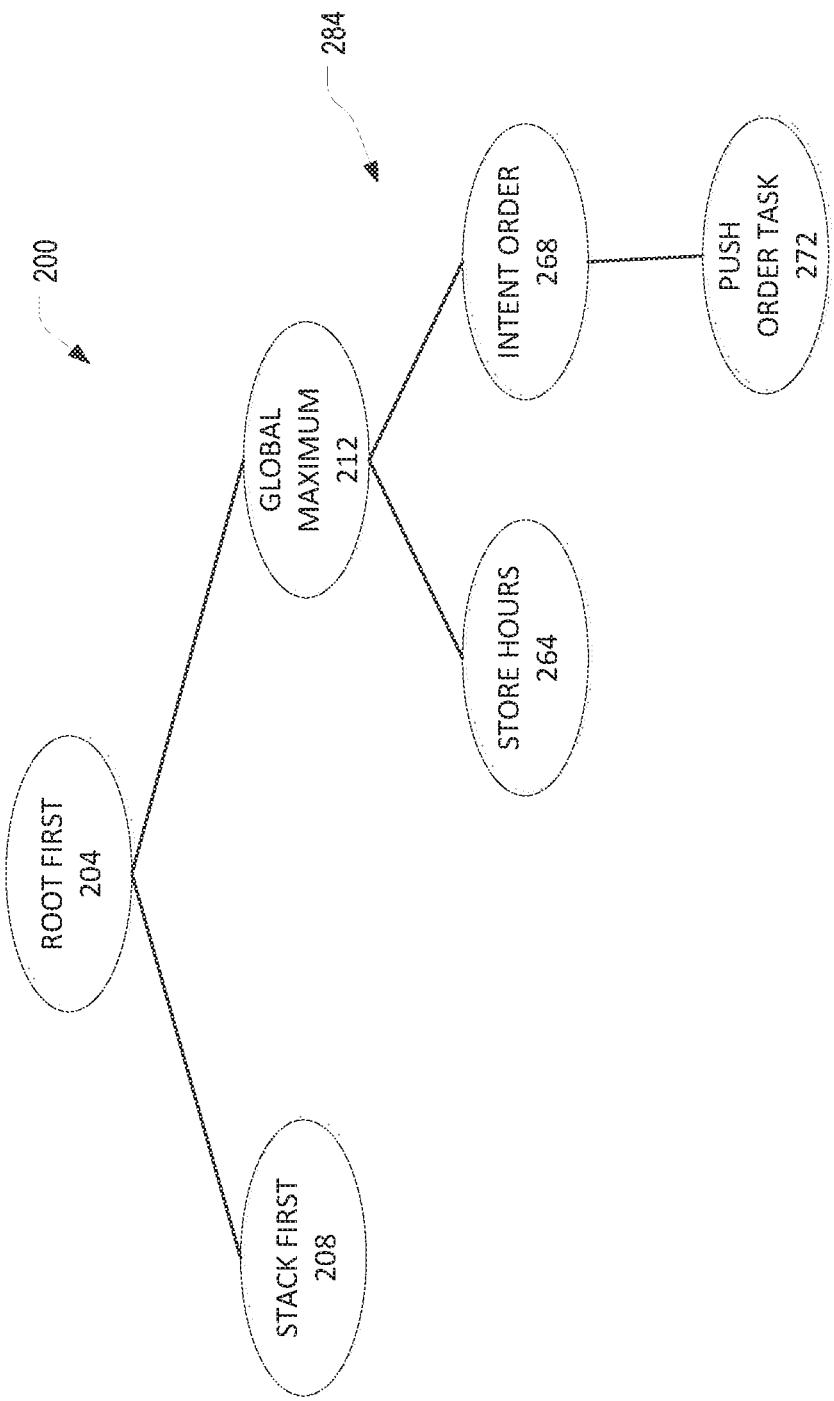
FIG. 2B is a graphical representation of the example scorable tree of FIG. 2A at the start of a conversation, in accordance with various embodiments.

FIG. 2B is a graphical representation of the example scorable tree 200 of FIG. 2A at the start of a conversation, in accordance with various embodiments. The root node 204 and the stack first node 208 have been initialized. The active global scorable functions have been incorporated into a global scorable subtree 284. As illustrated in FIG. 2B, the corresponding scoring stack would contain the following tasks:

Dialog Opening

Figure 2C:
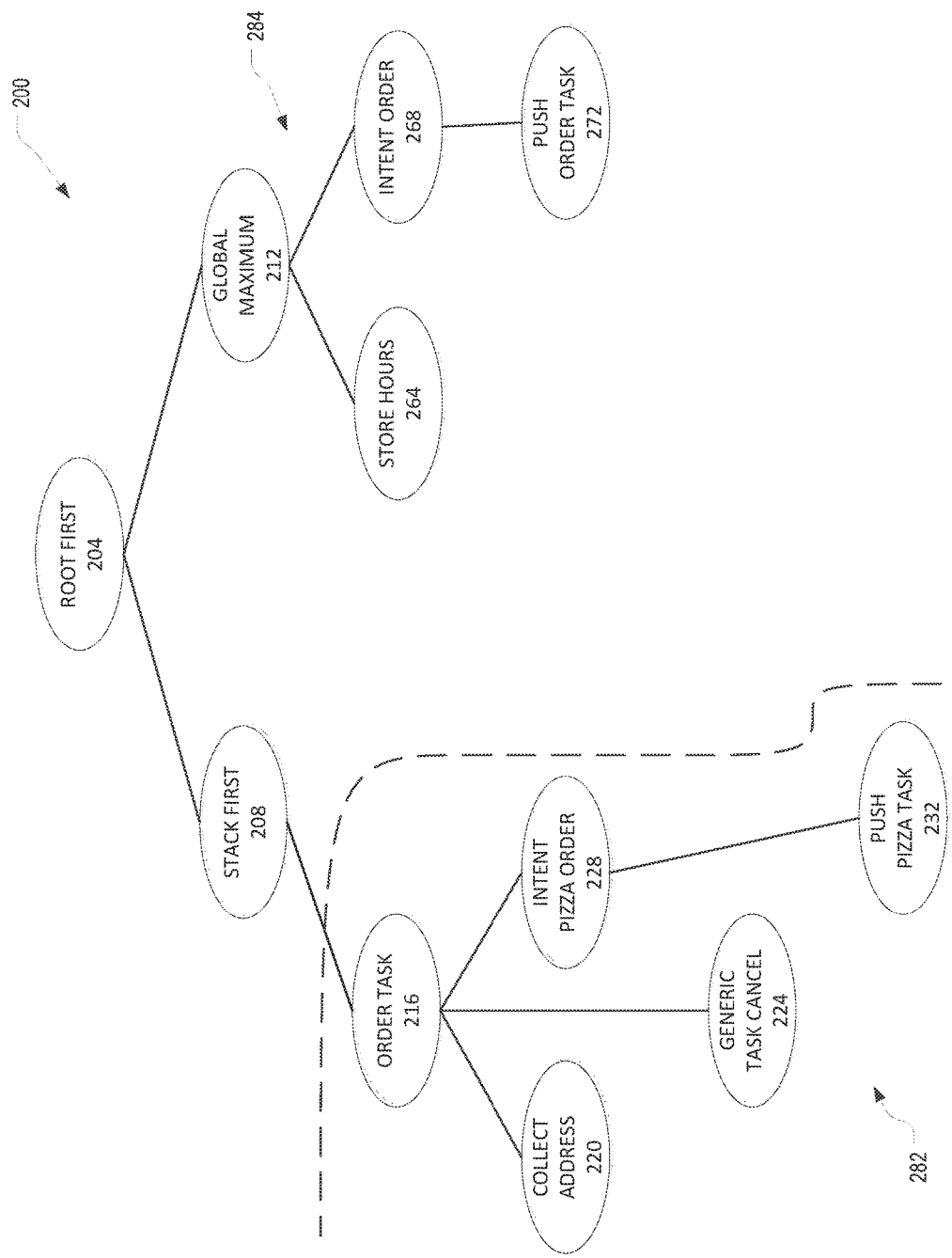
FIG. 2C is a graphical representation of the example scorable tree of FIG. 2A following the execution of the push order task, in accordance with various embodiments.

FIG. 2C is a graphical representation of the example scorable tree 200 of FIG. 2A following the execution of the order task corresponding to the order task node 268, in accordance with various embodiments. Following the processing of an incoming event where the order task node 268 was the winning node, the order task is executed and the order task subtree 282 is incorporated into the scorable tree 200. As illustrated in FIG. 2C, the corresponding scoring stack would contain the following tasks:

Dialog Opening
Order Task

Figure 2D:
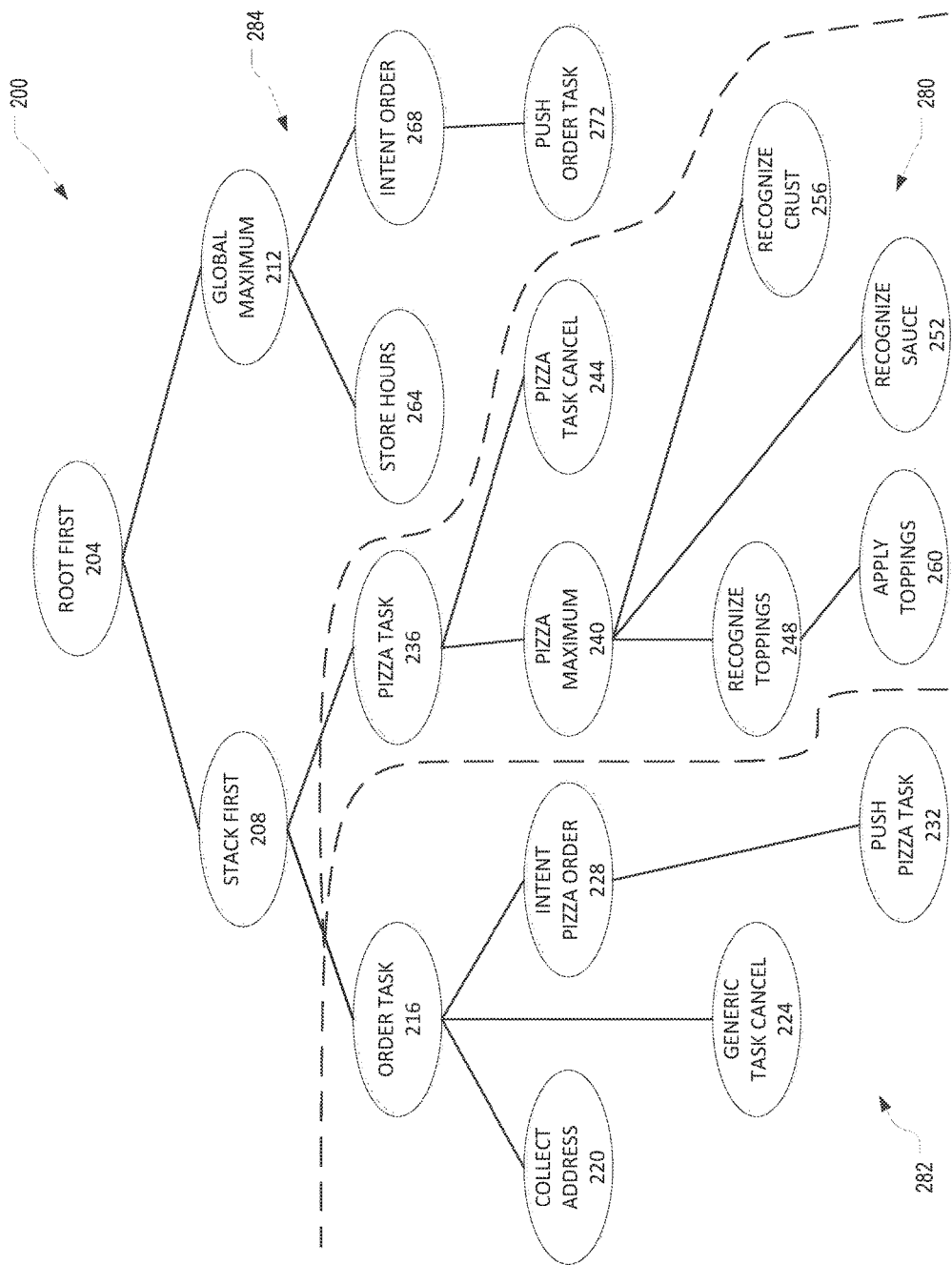
FIG. 2D is a graphical representation of the example scorable tree of FIG. 2A following the execution of the push pizza task, in accordance with various embodiments.

FIG. 2D is a graphical representation of the example scorable tree 200 of FIG. 2A following the execution of the push pizza task, in accordance with various embodiments. Following the processing of an incoming event where the push pizza task node 232 was the winning node, the push pizza task is executed and the pizza task subtree 280 is incorporated the scorable tree 200. As illustrated in FIG. 2D, the corresponding scoring stack would contain the following tasks:

Dialog Opening Task
Order Task
Pizza Task

In one example embodiment, an active scoring stack may be put in an inactive state (a hibernation mode) and a new scoring stack may be initialized to, for example, handle a divergence from a conversational track. For example, a conversation for booking an airline flight may diverge to a task of booking a hotel reservation. The scoring stack associated with the airline flight conversation may be put into an inactive state and a new scoring stack may be initialized for processing incoming events associated with the booking of the hotel reservation.

In one example embodiment, an interruption task may be appended to an active scoring stack. For example, a task, such as "interrupting task to ask 'which day,'" may be appended to the end of the scoring stack to enable interruption of the current conversational flow. The active scoring stack is put into an inactive state if the scorable function corresponding to the interrupting task is selected as the task to be executed and a new scoring stack is initialized to process the "ask which day" task. Once the "ask which day" task is complete, the new scoring stack is deactivated and the interrupted scoring stack is restored to an active state. The stack element, "interrupting task to ask 'which day,'" is also removed from the interrupted scoring stack.

In one example embodiment, the conversational track may be reset to an earlier state. This may be accomplished by using "breadcrumbs" to track the conversation and to reset the state to a particular point in the conversational track. The conversational track may also be reset to an earlier state by undoing a previous action, by using an escape hatch that resets the conversational track to the beginning, and the like. The conversational track may also be repaired by, for example, asking a question or presenting a statement that puts the user back onto the conversational track. In one example embodiment, the conversational track may be reset to an earlier state by modifying the elements (such as tasks) on the active scoring stack.

In one example embodiment, a dual-mode chatbot enables a computer-generated chatbot and a human agent to both contribute to the conversation. For example, a user who is frustrated in accomplishing a task with the chatbot may be seamlessly handed-off to a human agent. The chatbot and the human agent may each have associated scorable functions that determine whether the conversation is provided by the human agent or the chatbot. A task for each scorable action, such as "continue computer chatbot" and "transfer to human agent," may be appended to the active scoring stack and evaluated during the processing of each incoming event.

In one example embodiment, the processing of an incoming event comprises three phases: a recognition phase, a routing phase, and an action execution phase. In one example embodiment, the recognition phase and the routing phase are processed as a single phase. During the recognition phase, the incoming event, such as a user utterance, is processed to recognize, for example, the intent of the utterance. Recognition may include recognizing natural language (such as recognizing utterances via LUIS or a Q&A Maker knowledge base), recognizing visual element interaction (such as recognizing a selection of post backs from button presses on a user interface), recognizing external events (such as events generated by timers), recognizing internal events (such as a task interruption), and the like.

Entities associated with the incoming event may be identified during the recognition phase. Specified events are also defined for processing by the routing phase. For example, events, such as a time-of-day indicator, may be incorporated into an input vector that includes the recognized intent of the incoming event, the entities associated with the incoming event, and the like.

During the routing phase, a stack model or a global model may be utilized to route an event to a component that will execute an action associated with the event. Since the routing models are described using scorable functions, the routing models are also composable. In the stack model, the score of each scorable function on the scoring stack is computed starting, for example, at the bottom of the stack (the most recently added scorable function) and progressing toward the top of the scoring stack (the least recently added scorable function), followed by execution of the global scorable functions. In one example embodiment, all of the scorable functions identified on the scoring stack and the active scorable functions on the global list are evaluated during the routing phase. A tie-breaking algorithm may be used to select a scorable function in instances where the scores are the same or are within a predefined range of each other. The tie-breaking algorithm may, for example, give precedence to scorable functions that reside deeper on the stack. The predefined range may be, for example, 0.1; thus, the tie-breaking algorithm may be used in instances where the absolute values of the scores are within 0.1 of each other. In one example embodiment, the scores generated by the scorable functions are normalized in order to make them comparable.

In the global model, a scoring stack is not utilized; the recognition and dispatch of the incoming event are based on the global scorable functions, which can be individually activated and deactivated. The dispatching of the incoming event may be based on the intent of the incoming event. In the context of the chatbot, the intent may be based on, for example, the answer to the question: "what do you want to do?"

During the action execution phase, the action(s) corresponding to the incoming event is executed. In one example embodiment, the action execution phase uses the locally saved "selected children" information to delegate a performance of an action to one or more child nodes or uses the local per-node augmented data passed down the scorable tree to perform the action (such as sending a message to the user).

Information from the recognition phase and the routing phase may be forwarded to the component that performs the execution of the action. For example, the entities identified during the recognition phase may be forwarded to the component selected for processing the incoming event in order to assist in the execution of the action. (Alternatively, the component may have received and stored the entities identified during the recognition phase for use during the action execution phase.) The entities may be, for example, the departure and arrival cities identified for an airline flight. During the action execution phase (or otherwise prior to the recognition phase), the scoring stack is updated, if necessary, to identify the scorable functions that are currently in scope, where new tasks, sub-tasks, and scorable functions may be added to the bottom of the stack, existing tasks, sub-tasks, and scorable functions may be deleted from the stack, or both.

In one example embodiment, a chatbot federation may be implemented. In a federated configuration, a parent chatbot processes an incoming event and dispatches the incoming event to one of a plurality of child chatbots, where each child chatbot is directed, for example, to a particular domain. The parent chatbot utilizes scorable functions to provide disambiguation of the incoming event on behalf of the child chatbots. Thus, the action implemented in conjunction with the scorable function is a dispatch of the incoming event to the selected child chatbot(s).

In one example embodiment, scorable trees may be created with a hierarchical configuration. For example, a node of a high-level scorable tree can be configured to access another lower-level chatbot. The lower-level chatbot may similarly utilize a scorable tree for processing incoming events.

Figure 3:
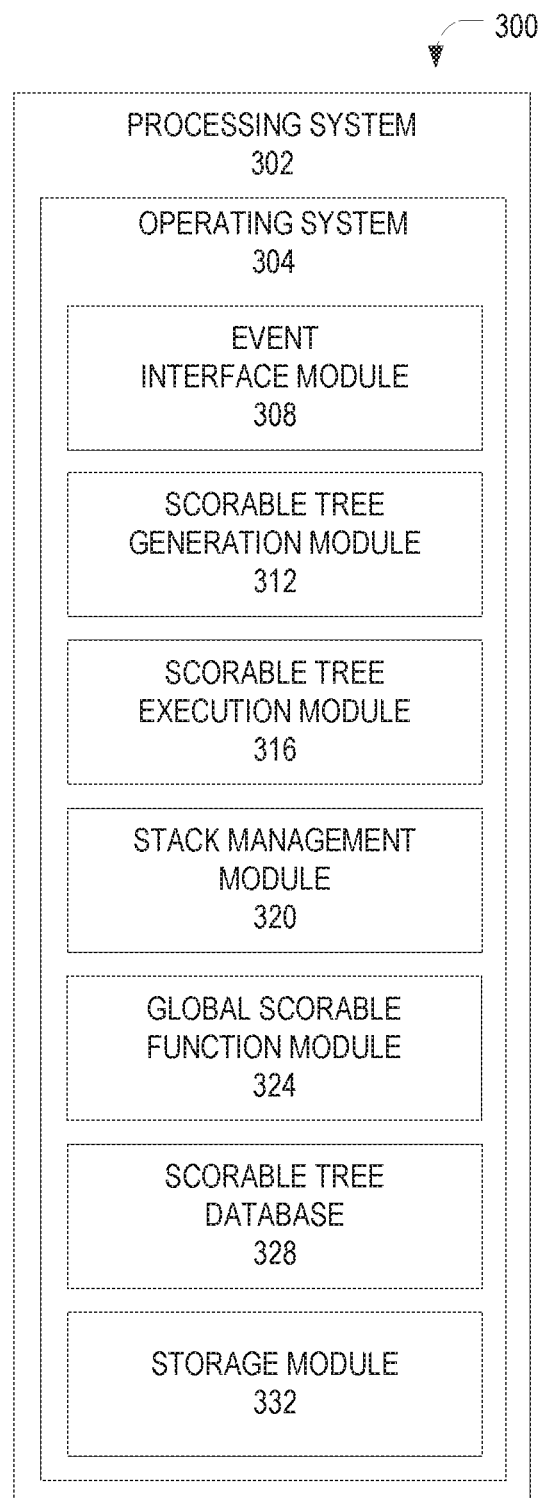
FIG. 3 is a block diagram of an example apparatus for processing an incoming event, in accordance with various embodiments.

FIG. 3 is a block diagram of an example apparatus 300 for processing an incoming event, in accordance with various embodiments. The apparatus 300 is shown to include a processing system 302 that may be implemented on a client or other processing device, and that includes an operating system 304 for executing software instructions. In accordance with an example embodiment, the apparatus 300 may include an event interface module 308, a scorable tree generation module 312, a scorable tree execution module 316, a stack management module 320, a global scorable function module 324, a scorable tree database 328, and a storage module 332.

The event interface module 308 may receive incoming events, such as textual information, a natural language utterance, and the like of a natural language conversation submitted by a user, a user's interaction with visual elements (such as a selection of a post back button within a quick reply), an external event, and the like. The event interface module 308 may forward the events to the scorable tree execution module 316 for processing.

Figure 7:
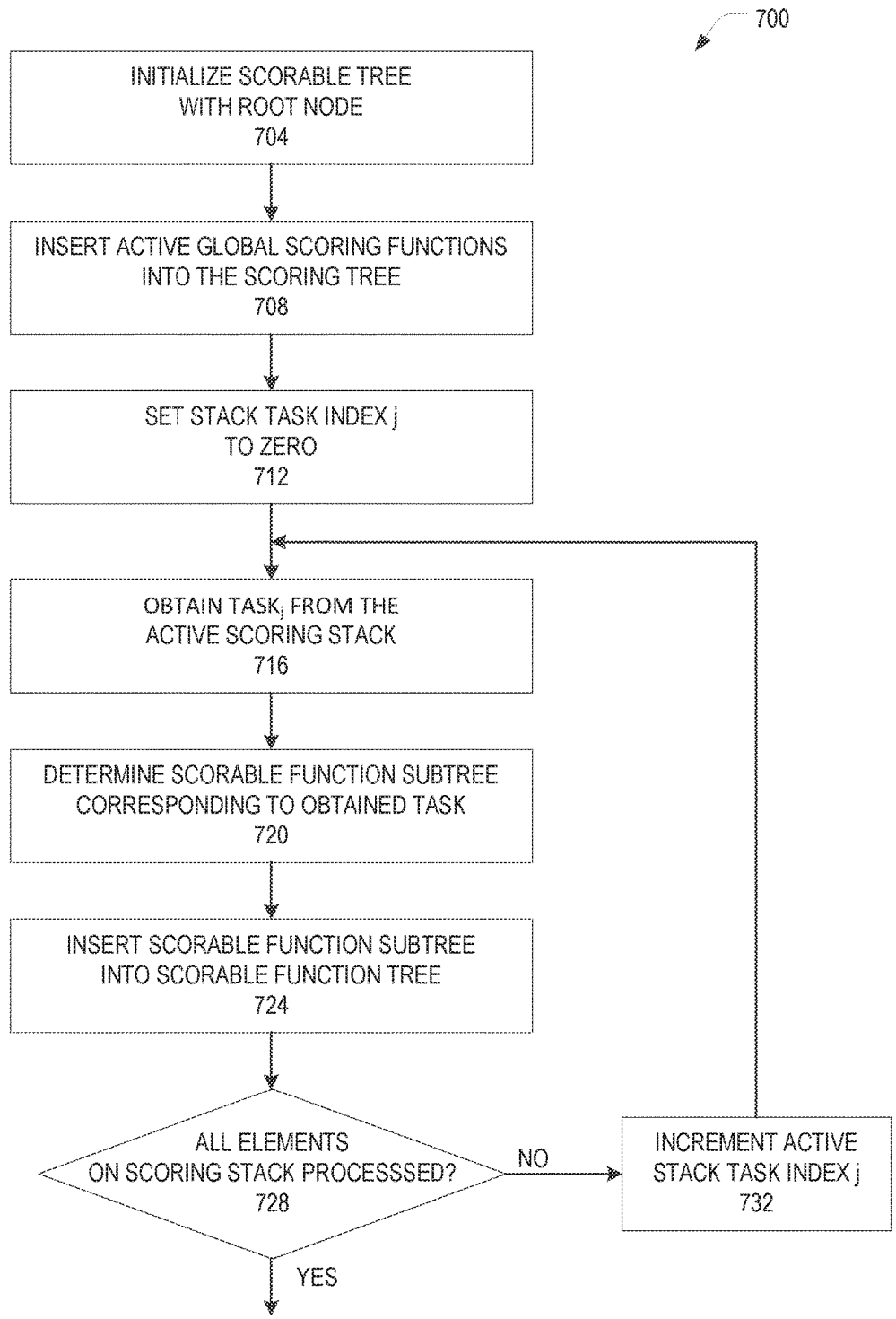
FIG. 7 is a flowchart for an example method for generating a scorable tree from a scoring stack, in accordance with various embodiments.

The scorable tree generation module 312 may generate a scorable tree based on the active global scorable functions and the tasks on the active scoring stack, as described more fully by way of example in conjunction with FIG. 7. The scorable tree generation module 312 may generate a new scorable tree or modify an existing scorable tree in response to changes in the status of the global scorable functions, a change to the active scoring stack, or a transition to a different active scoring stack.

The scorable tree execution module 316 may execute the scorable functions that correspond to the nodes of the scorable tree 200, as described more fully by way of example in conjunction with FIGS. 4A-4E. The scorable tree execution module 316 may receive events from the event interface module 308.

The stack management module 320 may initialize the scoring stacks, manage the storage of tasks on the scoring stacks, and identify the scoring stacks that are active and inactive, as described more fully by way of example in conjunction with FIG. 6.

The global scorable function module 324 may create the list of global scorable functions and maintain the status of each global scorable function.

Figure 4A:
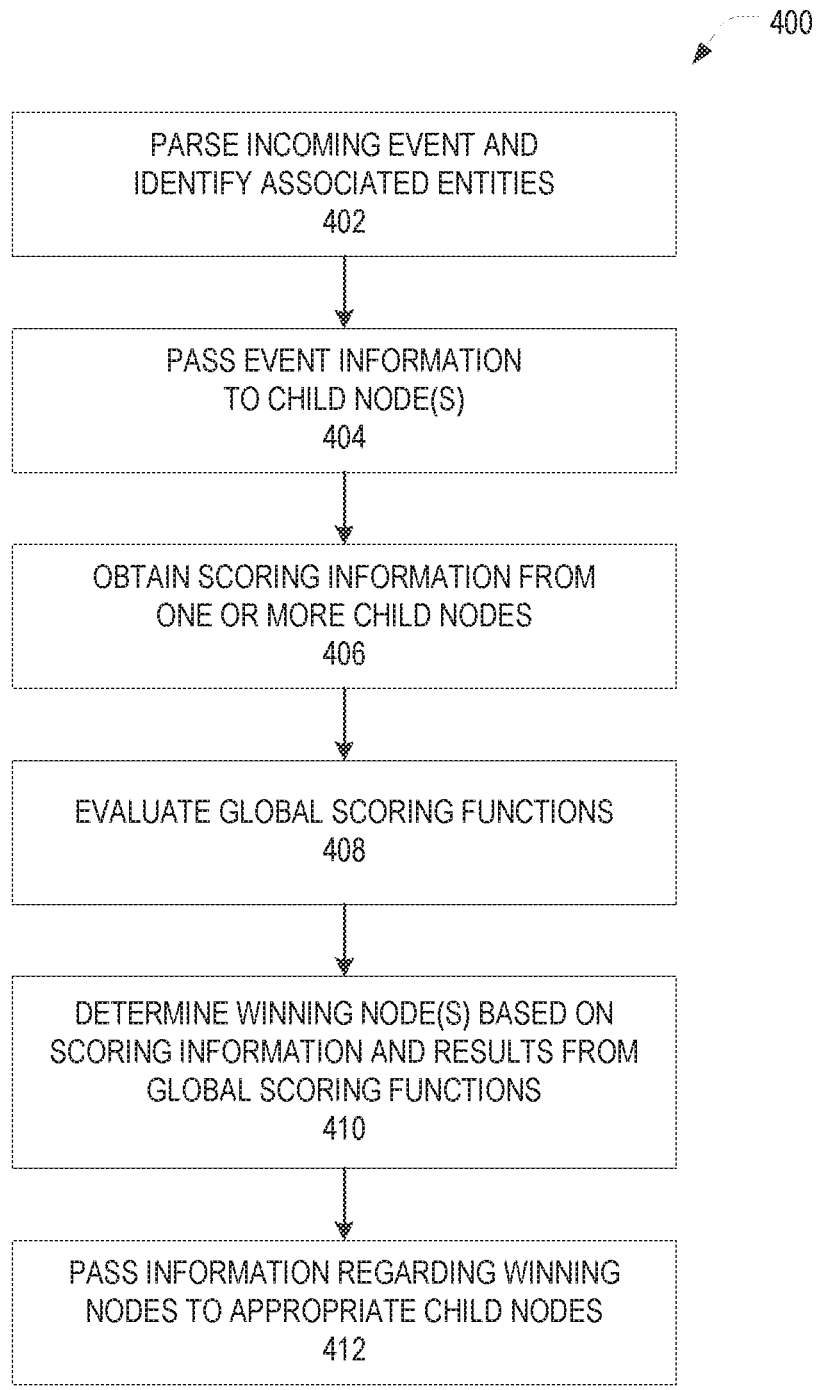
FIG. 4A is a flowchart for an example method for generating a score using a scorable tree from the perspective of a root node of the scorable tree, in accordance with various embodiments.

FIG. 4A is a flowchart for an example method 400 for generating a score using a scorable tree 200 from the perspective of a root node of the scorable tree 200, in accordance with various embodiments.

In one example embodiment, an incoming event is parsed at the root node (such as the root first node 204 of the scorable tree 200) and the entities associated with the incoming event are identified (operation 402). Event information, including the identified entities, are passed to the child nodes of the root node (operation 404). Scoring information is obtained from one or more of the child nodes (operation 406). For example, a boolean indicating if the event matched the criteria of the scorable function associated with the child node may be provided. A score value may also be obtained; the score value may be, for example, a confidence level that ranges from zero to one, where zero indicates that the incoming event is not relevant to the criteria of the scorable function and a one represents that the incoming event matches the criteria of the scorable function.

The global scorable functions corresponding to the root node are evaluated (operation 408) and the winning node(s) is determined based on the scoring information and the results of evaluating the global scorable functions (operation 410). As noted above, a tie-breaking algorithm may be used to select a scorable function in instances where the scores are the same or are within a predefined range of each other. The tie-breaking algorithm may, for example, give precedence to scorable functions that reside deeper on the scoring stack (toward the top of the scoring stack and the least recently added element). Information regarding the selected (winning) node is passed to one or more of the child nodes (operation 412). The information regarding the selected (winning) node may be passed to all of the child nodes, may be passed to only the winning nodes, may be passed to the nodes on a path to the winning nodes, or any combination thereof.

Figure 4B:
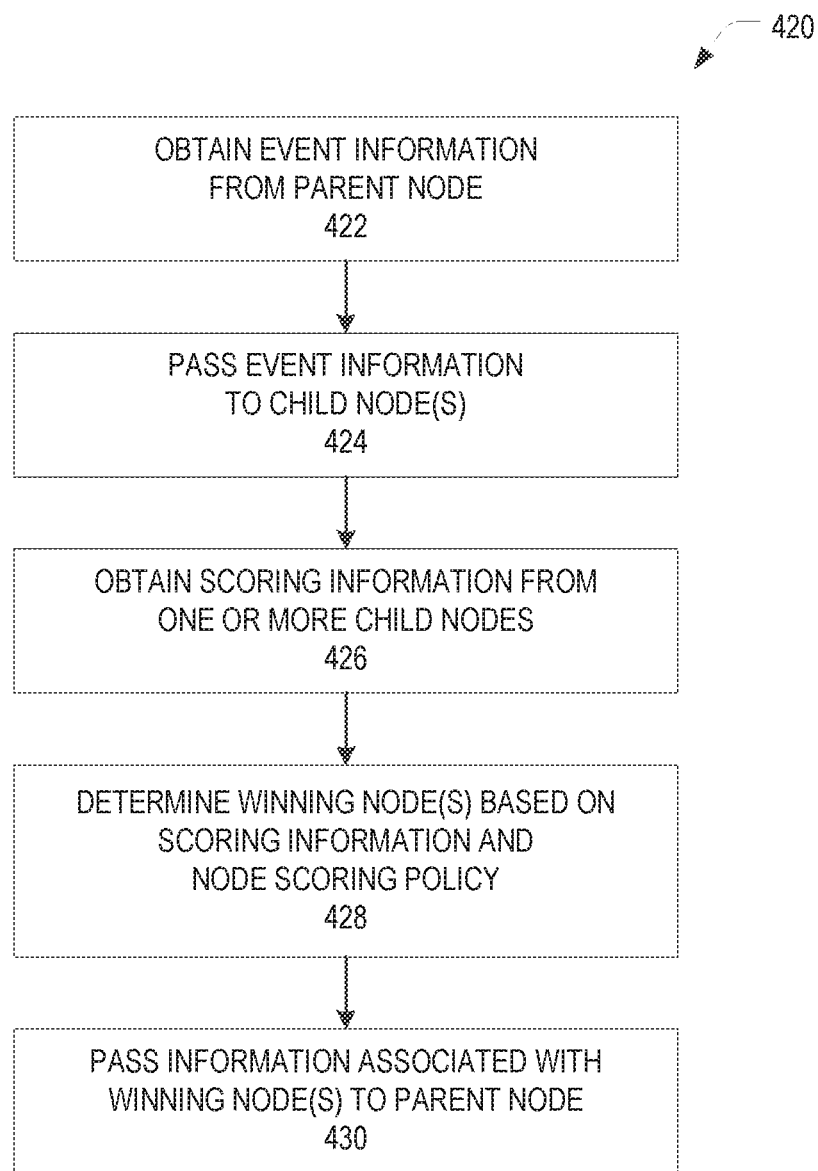
FIG. 4B is a flowchart for an example method for generating a score using a scorable tree from the perspective of a non-root parent node of the scorable tree, in accordance with various embodiments.

FIG. 4B is a flowchart for an example method 420 for generating a score using a scorable tree from the perspective of a non-root parent node of the scorable tree, in accordance with various embodiments.

In one example embodiment, event information is obtained by the non-root parent node from its parent node (operation 422). Event information, such as the entities associated with an incoming event, are transferred to child nodes of the non-root parent node (operation 424). Scoring information is obtained by the non-root parent node from each child node (operation 426). The non-root parent node determines the winning node(s) based on the policy of the non-root parent node, such as first, maximum, random, all, M of N, and the like (operation 428). As noted above, a tie-breaking algorithm may be used to select a scorable function in instances where the scores are the same or are within a predefined range of each other. The tie-breaking algorithm may, for example, give precedence to scorable functions that reside deeper on the stack. Information associated with the winning node(s), such as an identification of a path to a winning leaf node, is passed from the non-root parent node node to its parent node (operation 430).

Figure 4C:
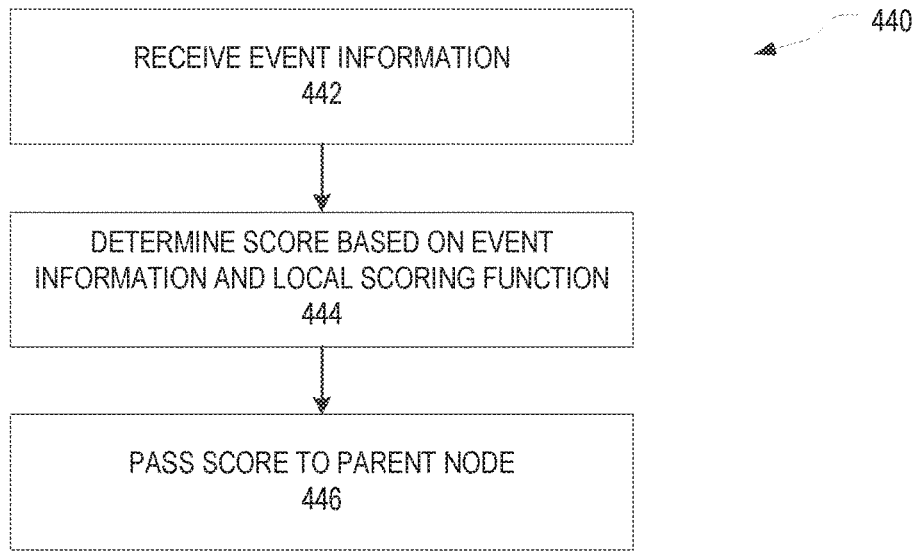
FIG. 4C is a flowchart for an example method for generating a score using a scorable tree from the perspective of a leaf node of the scorable tree, in accordance with various embodiments.

FIG. 4C is a flowchart for an example method 440 for generating a score using a scorable tree from the perspective of a leaf node of the scorable tree, in accordance with various embodiments.

In one example embodiment, event information, such as the identified entities, are received from the parent node of the leaf node (operation 442). A score is determined based on the event information and the scorable function corresponding to the leaf node (operation 444). The determined score is passed from the leaf node to the parent node of the leaf node (operation 446).

Figure 4D:
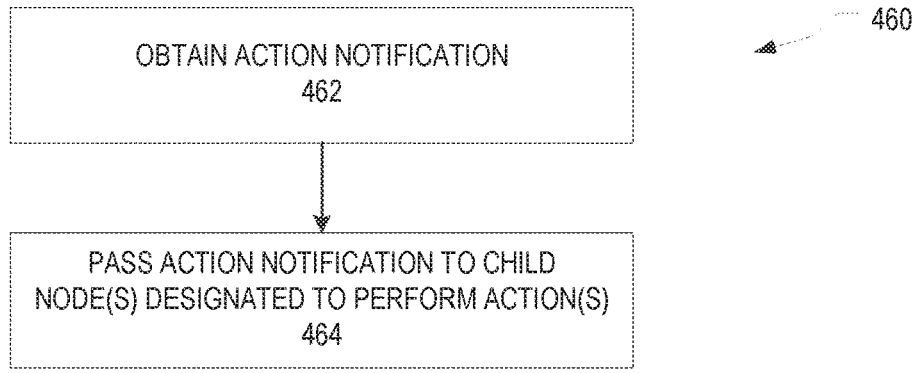
FIG. 4D is a flowchart for an example method for initiating an action using a scorable tree from the perspective of a parent node of the scorable tree, in accordance with various embodiments.

FIG. 4D is a flowchart for an example method 460 for initiating an action using a scorable tree from the perspective of a parent node of the scorable tree, in accordance with various embodiments.

In one example embodiment, a notification of an action to be performed is obtained from a parent node of the scorable tree (operation 462). The notification may identify the winning node(s), may identify one or more paths to the winning node(s), or both. The notification of the action is passed to the appropriate child node(s) of the parent node (operation 464).

Figure 4E:
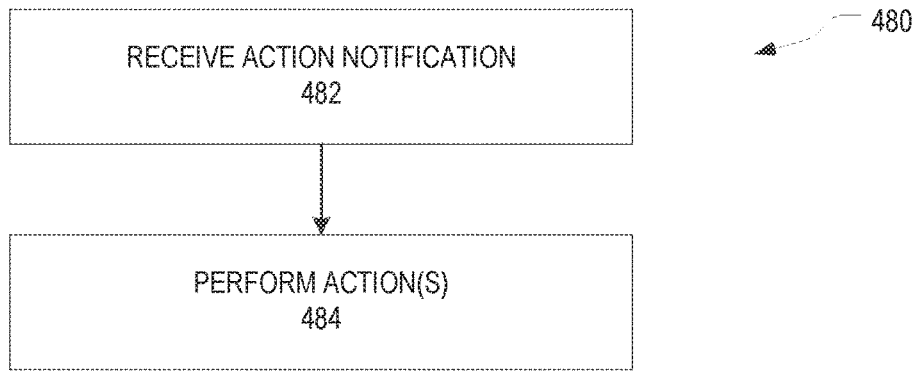
FIG. 4E is a flowchart for an example method for initiating an action using a scorable tree from the perspective of a leaf node of the scorable tree, in accordance with various embodiments.

FIG. 4E is a flowchart for an example method 480 for initiating an action using a scorable tree from the perspective of a leaf node of the scorable tree, in accordance with various embodiments.

In one example embodiment, a notification of an action is received from the parent node of the leaf node of the scorable tree (operation 482). An action is performed based on the notification (operation 484). For example, a template may be executed to generate output data, the scoring stack may be updated, the status of a global scorable function may be changed, and the like.

FIG. 5 is a flowchart for an example method 500 for managing global scorable functions, in accordance with various embodiments.

In one example embodiment, a list of global scorable functions is created based on, for example, a configuration profile (operation 504). The initial status of each global scorable function is set based on, for example, the configuration profile (operation 508).

FIG. 6 is a flowchart for an example method 600 for managing a scoring stack, in accordance with various embodiments.

In one example embodiment, a test is performed to determine the type of management operation to perform (operation 604). If the initialization of the first scoring stack is to be performed, the method 600 proceeds with operation 608. If a new stack is to be added, the method 600 proceeds with operation 620.

During operation 608, an empty stack is created and initialized. The active stack index is set to zero to indicate that the first scoring stack is the active scoring stack (operation 612).

During operation 620, a new scoring stack is created and initialized. The active stack index is incremented to point to the new scoring stack, thereby deactivating the current scoring stack and activating the new scoring stack (operation 624).

FIG. 7 is a flowchart for an example method 700 for generating a scorable tree from a scoring stack, in accordance with various embodiments.

In one example embodiment, a new scorable tree is initialized with a root node (operation 704). The active global scorable functions are inserted into the scorable tree (operation 708). A stack task index j is set to zero (operation 712). The stack task index j points to the next element on the active scoring stack. The next task on the active scoring stack is obtained (operation 716). For example, a task variable may be set to stack[i,j], where index i points to the active stack. A scorable function subtree corresponding to the obtained task is determined (operation 720) and inserted into the scorable tree (operation 724). The scorable tree subtree may be a predefined subtree created by a software developer.

A test is then performed to determine if all the elements on the scoring stack have been processed (operation 728). If all the elements on the scoring stack have not been processed, the method 700 proceeds with operation 732; otherwise, the method 700 ends. During operation 732, the stack task index j is incremented to point to the next task on the scoring stack and the method 700 proceeds with operation 716.

Figure 8:
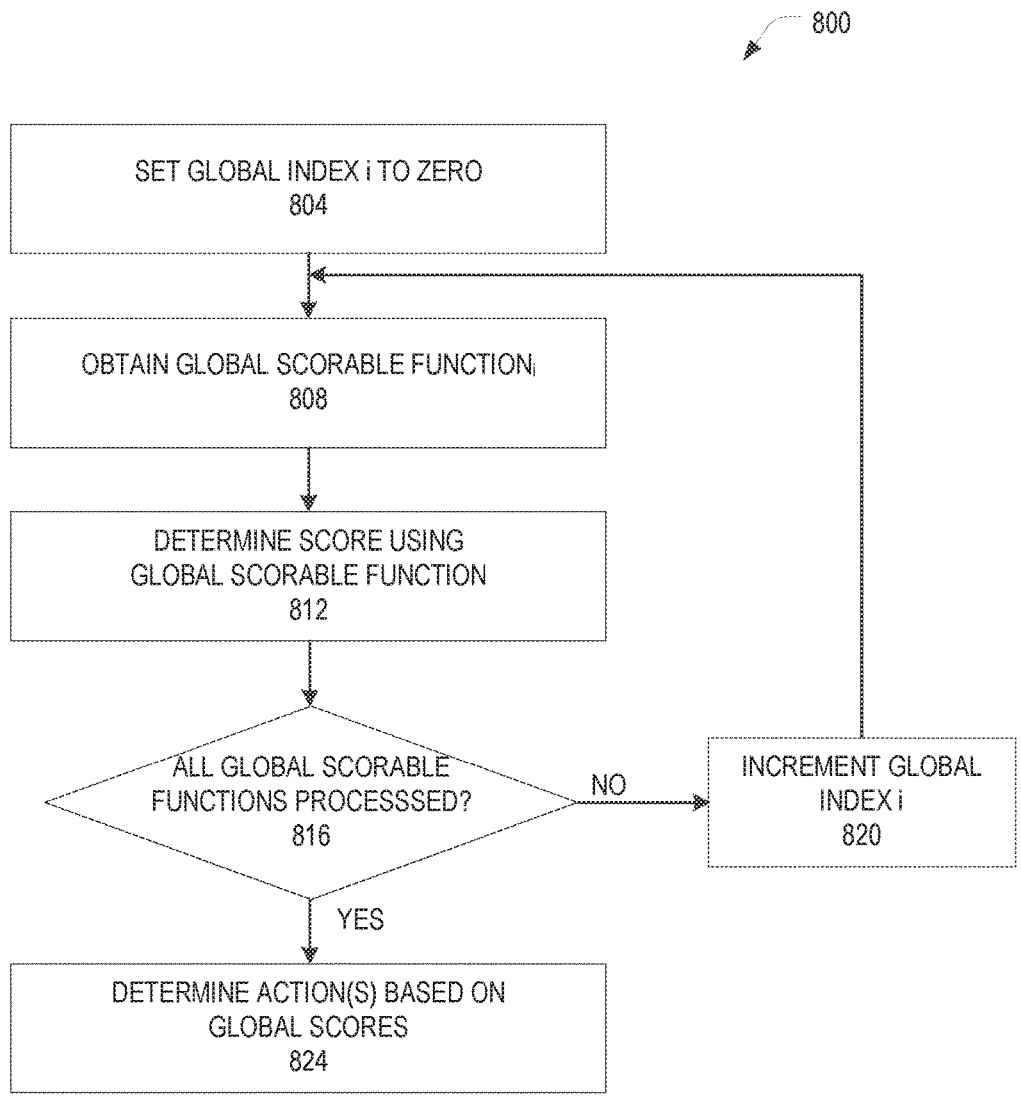
FIG. 8 is a flowchart for an example method for generating a score using a global model, in accordance with various embodiments.

FIG. 8 is a flowchart for an example method 800 for generating a score using a global model, in accordance with various embodiments.

In one example embodiment, a global index i is set to zero (operation 804) and the next global scorable function is obtained from the list of global scorable functions (operation 808). A score is determined using the obtained global scorable function (operation 812). A test is then performed to determine if all the global scorable functions have been processed (operation 816). If all the global scorable functions have not been processed, the method 800 proceeds with operation 820; otherwise, the action(s) to be performed are determined based on the global scores generated during operation 812 (operation 824) and the method 800 ends. During operation 820, the global index i is incremented to point to the next global scorable function and the method 800 proceeds with operation 808.

Figure 9:
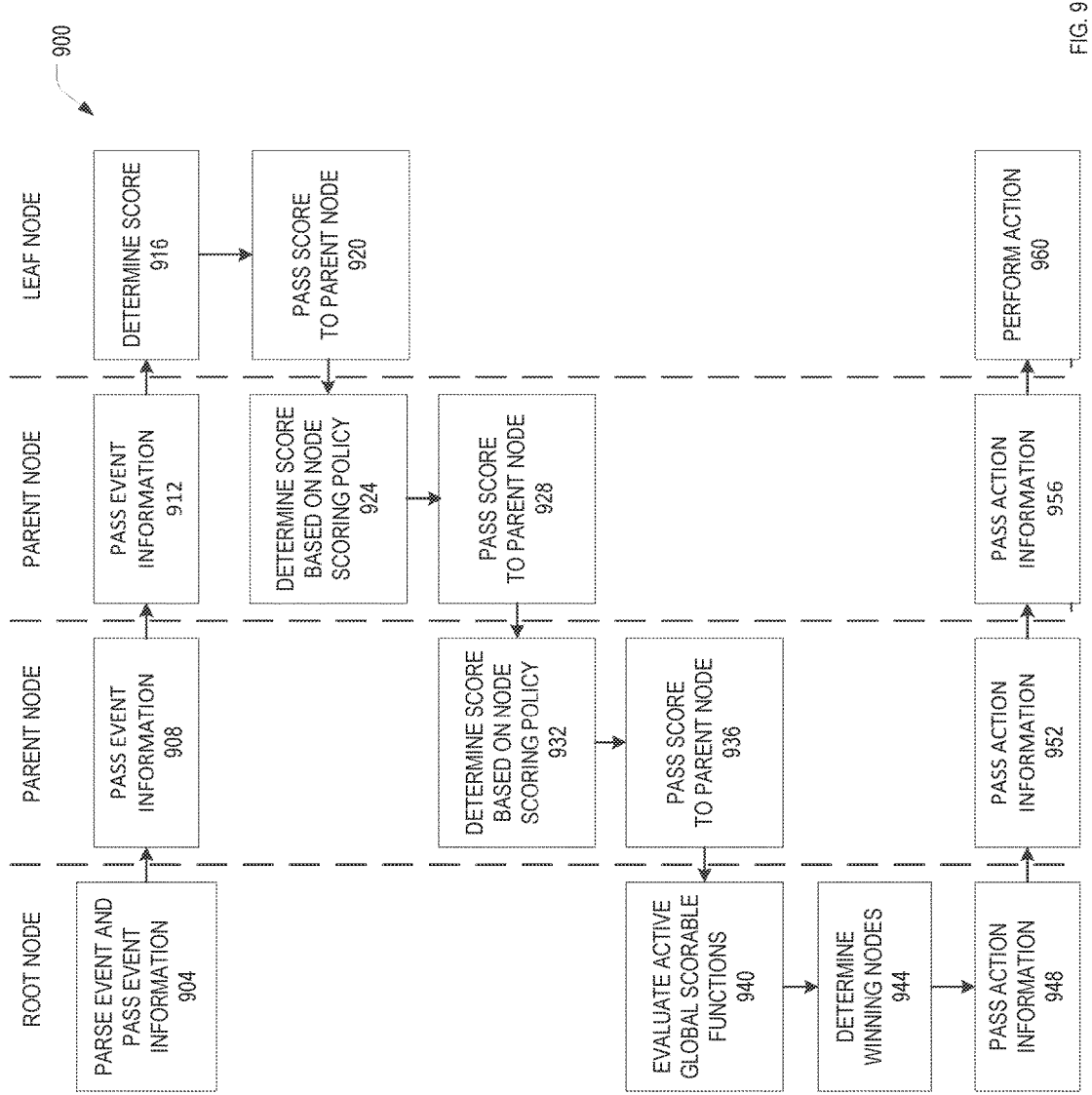
FIG. 9 is a sequence diagram for an example scorable tree, in accordance with various embodiments.

FIG. 9 is a sequence diagram 900 for an example scorable tree, in accordance with various embodiments. In one example embodiment, an incoming event is parsed at the root node (such as the root first node 204 of the scorable tree 200) and the event information, including the identified entities, are passed to the child nodes of the root node (operation 904).

The event information is obtained by a first non-root parent node from the root node and is passed to child nodes of the first non-root parent node (operation 908). Similarly, event information is obtained by a second non-root parent node from its parent node and is passed to child nodes of the second non-root parent node (operation 912). The event information is received by a leaf node of the scorable tree and a score is determined based on the event information and the scorable function corresponding to the leaf node (operation 916). The determined score is passed from the leaf node to its parent node (operation 920).

The scoring information is obtained by the second non-root parent node and a score is determined based on the policy of the second non-root parent node, such as first, maximum, random, all, M of N, and the like (operation 924). The score generated by the second non-root parent node is passed to the first non-root parent node (operation 928). Similarly, the scoring information is obtained by the first non-root parent node and a score is determined based on the policy of the first non-root parent node, such as first, maximum, random, all. M of N, and the like (operation 932). The score generated by the first non-root parent node is passed to the root parent node (operation 936).

The scoring information is obtained by the root node from one or more of the child nodes and the global scorable functions are evaluated (operation 940). The winning node(s) is determined based on the scoring information and the results of evaluating the global scorable functions (operation 944). Information regarding the selected (winning) node (also known as action information herein) is passed to one or more of the child nodes including, for example, the first non-root parent node (operation 948). The action information may be passed to all of the child nodes, may be passed to only the winning nodes, may be passed to the nodes on a path to the winning nodes, or any combination thereof.

The action information is obtained from the root node by the first non-root parent node and is passed to the appropriate child node(s) of the first non-root parent node (operation 952). Similarly, the action information is obtained from the first non-root parent node by the second non-root parent node and is passed to the appropriate child node(s) of the second non-root parent node (operation 956).

The action information is received by the leaf node of the scorable tree and an action is performed based on the notification (operation 960). For example, a template may be executed to generate output data, the scoring stack may be updated, the status of a global scorable function may be changed, and the like.

Figure 10:
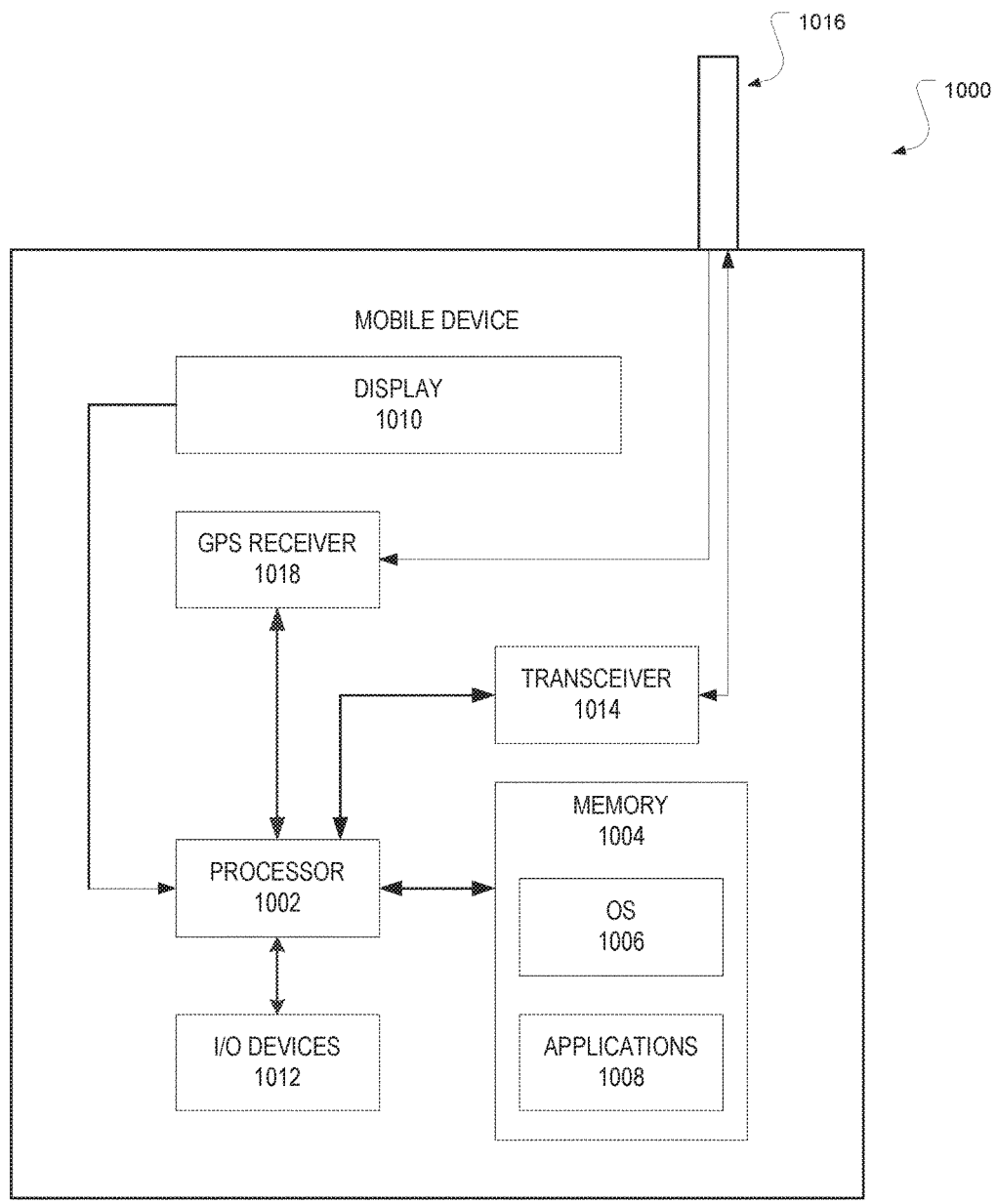
FIG. 10 is a block diagram illustrating a mobile device, according to various embodiments.

FIG. 10 is a block diagram illustrating a mobile device 1000, in accordance with various embodiments. The mobile device 1000 can include a processor 1002. The processor 1002 can be any of a variety of different types of commercially available processors suitable for mobile devices 1000 (for example, an XScale architecture microprocessor, a microprocessor without interlocked pipeline stages (MIPS) architecture processor, or another type of processor). A memory 1004, such as a random access memory (RAM), a flash memory, or another type of memory, is typically accessible to the processor 1002. The memory 1004 can be adapted to store an operating system (OS) 1006, as well as applications 1008, such as a mobile location-enabled application that can provide location-based services (LBSs) to a user. The processor 1002 can be coupled, either directly or via appropriate intermediary hardware, to a display 1010 and to one or more input/output (I/O) devices 1012, such as a keypad, a touch panel sensor, and a microphone. Similarly, in some embodiments, the processor 1002 can be coupled to a transceiver 1014 that interfaces with an antenna 1016. The transceiver 1014 can be configured to both transmit and receive cellular network signals, wireless data signals, or other types of signals via the antenna 1016, depending on the nature of the mobile device 1000. Further, in some configurations, a global positioning system (GPS) receiver 1018 can also make use of the antenna 1016 to receive GPS signals.

Figure 11:
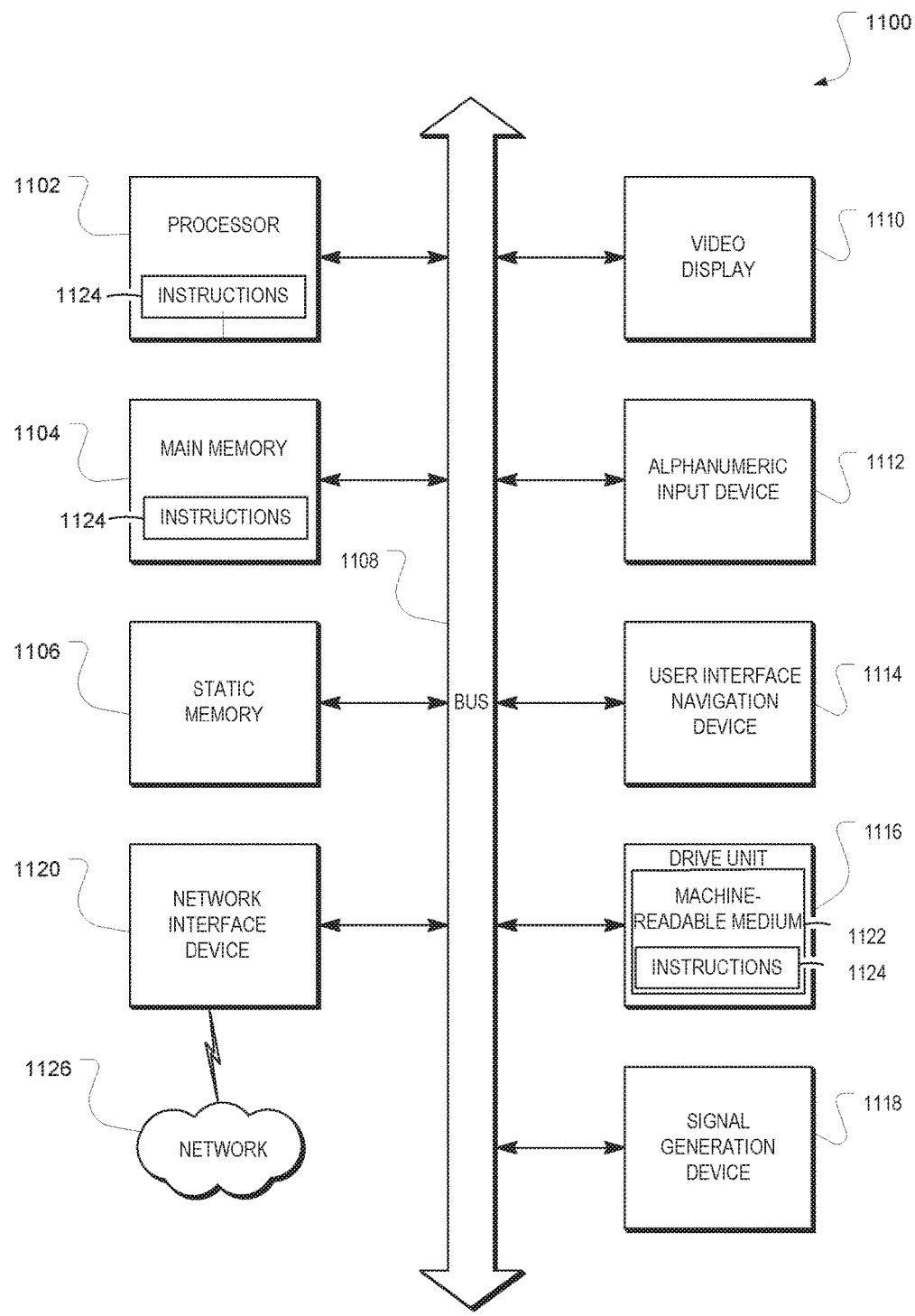
FIG. 11 is a block diagram of a computer processing system within which a set of instructions may be executed for causing a computer to perform any one or more of the methodologies discussed herein.

FIG. 11 is a block diagram of a computer processing system 1100 within which a set of instructions 1124 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed as software-as-a-service (SaaS), by an application service provider (ASP), or by utility computing providers. The computer may be a server computer, a personal computer (PC), a tablet PC, a personal digital assistant (PDA), a cellular telephone, or any processing device capable of executing a set of instructions 1124 (sequential or otherwise) that specify actions to be taken by that device. Further, while only a single computer is illustrated, the term "computer" shall also be taken to include any collection of computers that, individually or jointly, execute a set (or multiple sets) of instructions 1024 to perform any one or more of the methodologies discussed herein.

The example computer processing system 1100 includes a processor 1102 (e.g., a central processing unit (CPU), a graphics processing unit (GPU), or both), a main memory 1104, and a static memory 1106, which communicate with each other via a bus 1108. The computer processing system 1100 may further include a video display 1110 (e.g., a plasma display, a liquid crystal display (LCD), or a cathode ray tube (CRT)). The computer processing system 1100 also includes an alphanumeric input device 1112 (e.g., a keyboard), a user interface navigation device 1114 (e.g., a mouse and/or touch screen), a drive unit 1116, a signal generation device 1118 (e.g., a speaker), and a network interface device 1120.

The drive unit 1116 includes a machine-readable medium 1122 on which is stored one or more sets of instructions 1124 and data structures embodying or utilized by any one or more of the methodologies or functions described herein. The instructions 1124 may also reside, completely or at least partially, within the main memory 1104, the static memory 1106, and/or the processor 1102 during execution thereof by the computer processing system 1100, the main memory 1104, the static memory 1106, and the processor 1102 also constituting tangible machine-readable media 1122.

The instructions 1124 may further be transmitted or received over a network 1126 via the network interface device 1120 utilizing any one of a number of well-known transfer protocols (e.g., Hypertext Transfer Protocol (HTTP)).

While the machine-readable medium 1122 is shown, in an example embodiment, to be a single medium, the term "machine-readable medium" should be taken to include a single medium or multiple media (e.g., a centralized or distributed database, and/or associated caches and servers) that store the one or more sets of instructions 1124. The term "machine-readable medium" shall also be taken to include any medium that is capable of storing, encoding, or carrying a set of instructions 1124 for execution by the computer and that cause the computer to perform any one or more of the methodologies of the present application, or that is capable of storing, encoding, or carrying data structures utilized by or associated with such a set of instructions 1124. The term "machine-readable medium" shall accordingly be taken to include, but not be limited to, solid-state memories and optical and magnetic media.

While the various embodiments are described herein with reference to various implementations and exploitations, it will be understood that these embodiments are illustrative and that the scope of the disclosure is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of this disclosure. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of this disclosure.

What is claimed is:

1. A method for dispatching an incoming event, comprising:
   obtaining a scorable tree;
   submitting the incoming event to a root node of the scorable tree for processing, the root node corresponding to at least one of one or more hardware processors;
   augmenting, using at least one of the one or more hardware processors, the incoming event with scoring data generated by the root node to create a scoring event;
   iteratively passing, using at least one of the one or more hardware processors, the scoring event from each parent node of the scorable tree to each corresponding child node of the scorable tree for further processing until each leaf node of each branch of the scorable tree is reached, wherein each child node augments an incoming scoring event with additional scoring data and each leaf node generates an intermediate scoring event; and
   iteratively passing, using at least one of the one or more hardware processors, each intermediate scoring event from each child node of the scorable tree to each corresponding parent node, where each child node produces a scoring result, the scoring result comprising an identification of a path to one or more selected child nodes and final scoring information based on data received from one or more corresponding child nodes.

2. The method of claim 1, wherein at least one parent node of the scorable tree selects a maximum scoring result of one or more scoring results that indicate a match for the incoming event, the one or more scoring results obtained from one or more child nodes.

3. The method of claim 1, wherein at least one parent node of the scorable tree selects a first scoring result of one or more scoring results that indicate a match for the incoming event, the one or more scoring results obtained from one or more child nodes.

4. The method of claim 1, wherein at least one parent node of the scorable tree selects M scoring results of one or more scoring results that indicate a match for the incoming event, the one or more scoring results obtained from one or more child nodes, where M is an integer and M is greater than one.

5. The method of claim 1, wherein at least one parent node of the scorable tree randomly selects one or more scoring results of one or more scoring results that indicate a match for the incoming event, the one or more scoring results obtained from one or more child nodes.

6. The method of claim 1, wherein the passed scoring event comprises one or more entities and the passed intermediate scoring event comprises a value score and a Boolean value.

7. The method of claim 1, further comprising determining a final score at the root node of the scorable tree based on an intermediate scoring result from at least one of the one or more corresponding child nodes.

8. The method of claim 7, wherein the final score comprises a confidence level that ranges from zero to one.

9. The method of claim 7, wherein the final score is based on a result generated by a global scorable function.

10. The method of claim 1, further comprising iteratively passing a scoring decision from a parent node of the scorable tree to each corresponding child node of the parent node for further processing.

11. The method of claim 10, further comprising performing one or more actions at one of the one or more corresponding child nodes based on the scoring decision.

12. The method of claim 1, wherein the incoming event is a component of a natural language conversation.

13. The method of claim 1, wherein the incoming event is an internal or external event.

14. The method of claim 1, further comprising parsing the incoming event at the root node of the scorable tree to identify one or more entities.

15. The method of claim 1, further comprising defining a group of scorable functions and assigning a priority to the group, the priority used to determine an order of evaluation of the scorable functions.

16. The method of claim 1, further comprising designating a scorable function as a global scorable function.

17. The method of claim 16, further comprising maintaining a status for each global scorable function, the status designating a corresponding scorable function as active or inactive.

18. The method of claim 1, wherein the scoring data and the additional scoring data is inferred from the incoming scoring event or is obtained from an external data source.

19. An apparatus comprising:
one or more hardware processors;
memory to store instructions that, when executed by the one or more hardware processors perform operations comprising:
obtaining a scorable tree;
submitting the incoming event to a root node of the scorable tree for processing, the root node corresponding to at least one of one or more hardware processors;
augmenting, using at least one of the one or more hardware processors, the incoming event with scoring data generated by the root node to create a scoring event;
iteratively passing, using at least one of the one or more hardware processors, the scoring event from each parent node of the scorable tree to each corresponding child node of the scorable tree for further processing until each leaf node of each branch of the scorable tree is reached, wherein each child node augments an incoming scoring event with additional scoring data and each leaf node generates an intermediate scoring event; and
iteratively passing, using at least one of the one or more hardware processors, each intermediate scoring event from each child node of the scorable tree to each corresponding parent node, where each child node produces a scoring result, the scoring result comprising an identification of a path to one or more selected child nodes and final scoring information based on data received from one or more corresponding child nodes.

20. A non-transitory machine-readable storage medium comprising instructions, which when implemented by one or more machines, cause the one or more machines to perform operations comprising:
obtaining a scorable tree;
submitting the incoming event to a root node of the scorable tree for processing, the root node corresponding to at least one of one or more hardware processors;
augmenting, using at least one of the one or more hardware processors, the incoming event with scoring data generated by the root node to create a scoring event;
iteratively passing, using at least one of the one or more hardware processors, the scoring event from each parent node of the scorable tree to each corresponding child node of the scorable tree for further processing until each leaf node of each branch of the scorable tree is reached, wherein each child node augments an incoming scoring event with additional scoring data and each leaf node generates an intermediate scoring event; and
iteratively passing, using at least one of the one or more hardware processors, each intermediate scoring event from each child node of the scorable tree to each corresponding parent node, where each child node produces a scoring result, the scoring result comprising an identification of a path to one or more selected child nodes and final scoring information based on data received from one or more corresponding child nodes.

* * * * *